C. SHELDON.
TERRESTRIAL ORRERY.
APPLICATION FILED JUNE 29, 1911.
1,050,044.
Patented Jan. 7, 1913.
4 SHEETS—SHEET 2.
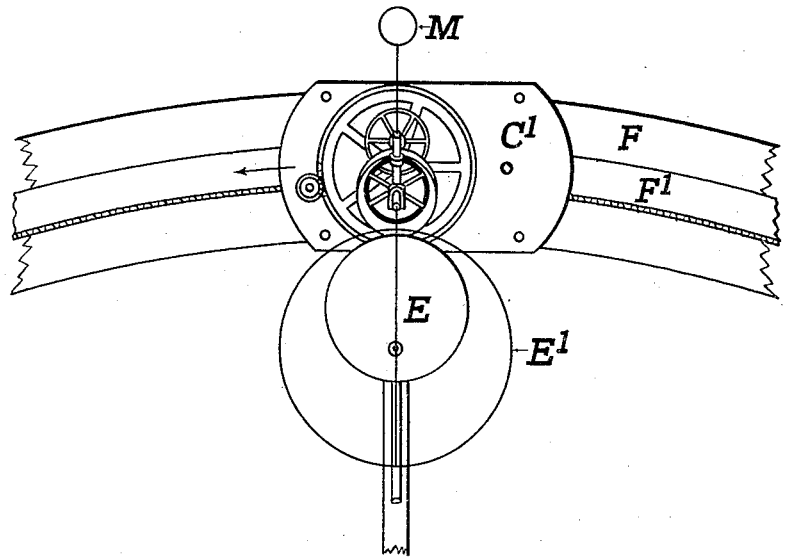
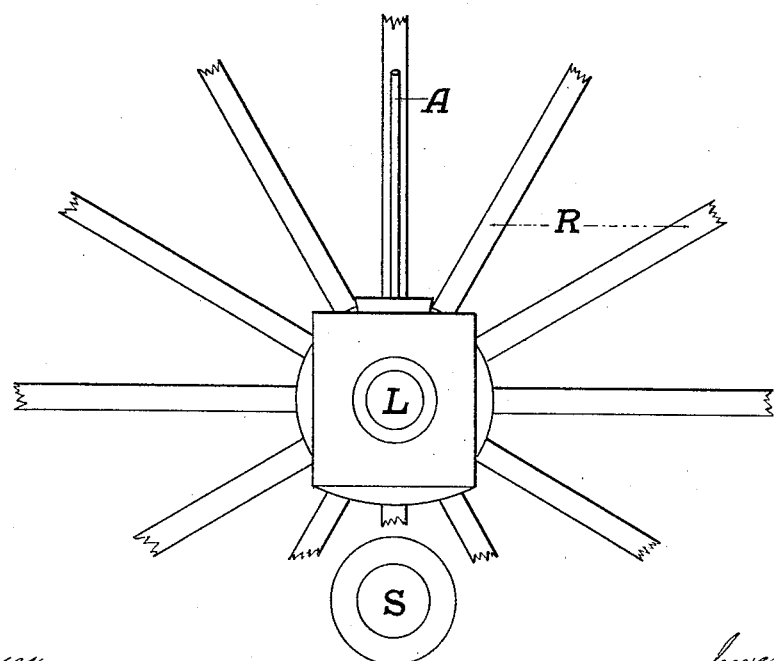
FIG: 3

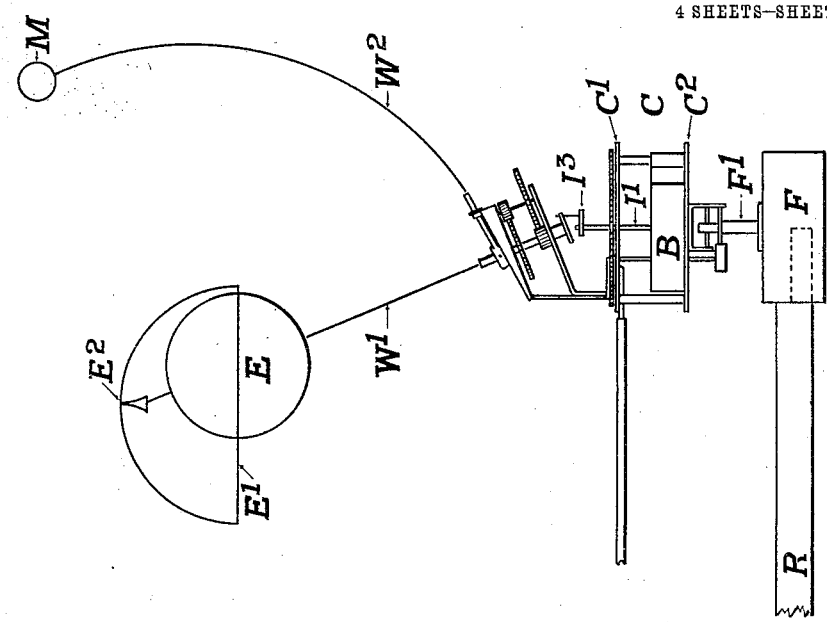
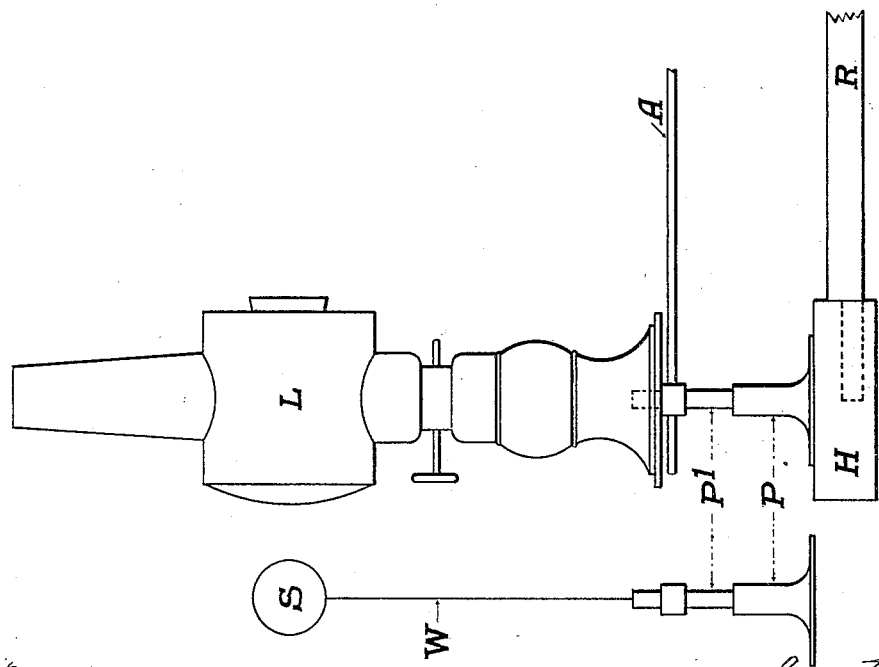

C. SHELDON.
TERRESTRIAL ORRERY.
APPLICATION FILED JUNE 29, 1911.
1,050,044.
Patented Jan. 7, 1913.
4 SHEETS—SHEET 3.
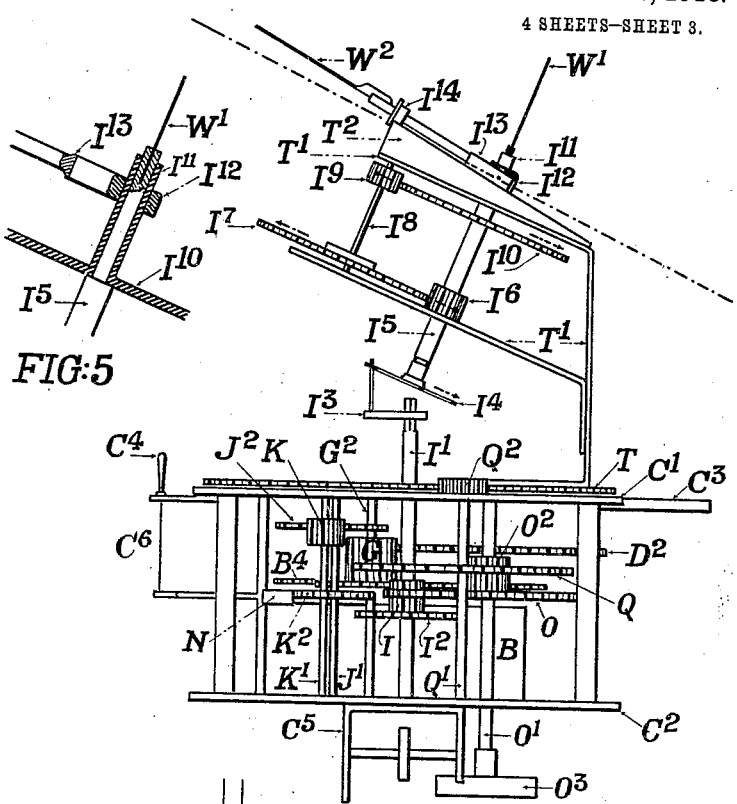
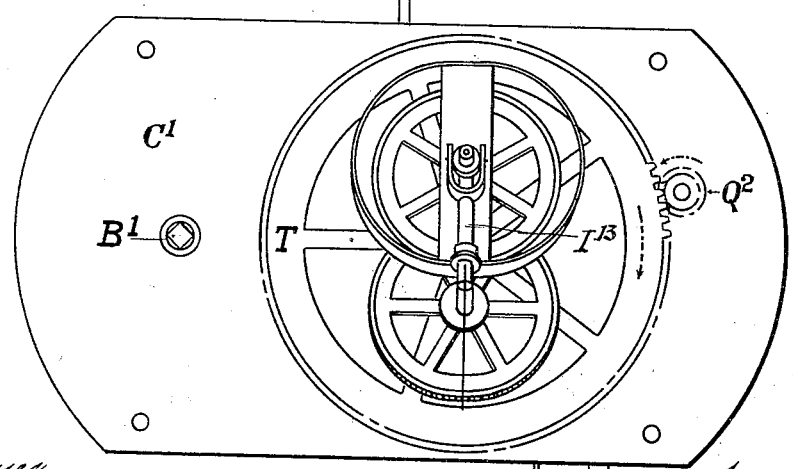

C. SHELDON.
TERRESTRIAL ORRERY.
APPLICATION FILED JUNE 29, 1911.

1,050,044.

Patented Jan. 7, 1913.
4 SHEETS—SHEET 4.

UNITED STATES PATENT OFFICE.

CHARLES SHELDON, OF BRISBANE, QUEENSLAND, AUSTRALIA.

TERRESTRIAL ORRERY.

1,050,044.  Specification of Letters Patent.  Patented Jan. 7, 1913.

Application filed June 29, 1911. Serial No. 635,963.

*To all whom it may concern:*

Be it known that I, CHARLES SHELDON, a subject of the King of the United Kingdom of Great Britain and Ireland, residing at Brisbane, Queensland, Commonwealth of Australia, have invented new and useful Improvements in Terrestrial Orreries, of which the following is a specification.

This invention relates to a terrestrial orrery, the objects being to automatically produce a representation of the motions of the earth and moon in their orbits around the sun, to demonstrate the varying positions of the orbs, to show day and night, the lengthening and shortening of days, the seasons, the apparent track of the sun from tropic to tropic, the lunations of the moon, the solar and lunar eclipses, the aphelion and perihelion of the earth and apogee and perigee of the moon, all in their true order and at their true relative positions in the heavens.

The invention consists of a metal ring mounted upon a stand forming the running bed or plane. The ring is provided with teeth for engaging with a toothed pinion on a carriage containing trains of wheels operated by clockwork. To this carriage is fixed a ball representing the earth and a ball representing the moon which travels around the bed or plane. In the center of the bed is a pedestal supporting a ball representing the sun or a lamp used in dark room. This center standard is connected by a rod to the carriage and revolves as the carriage travels around the ring thus concentrating the light from the lamp upon the balls representing the earth and moon.

To fully describe the invention I will now refer to the drawings in which:—

Figure 7:
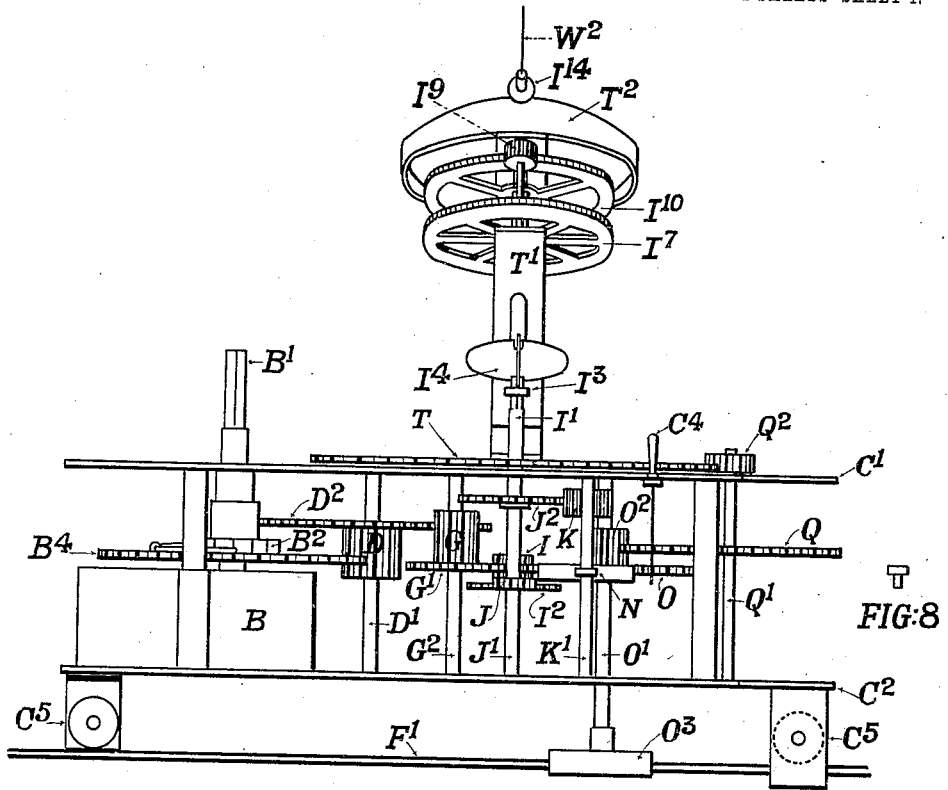
Figure 9:
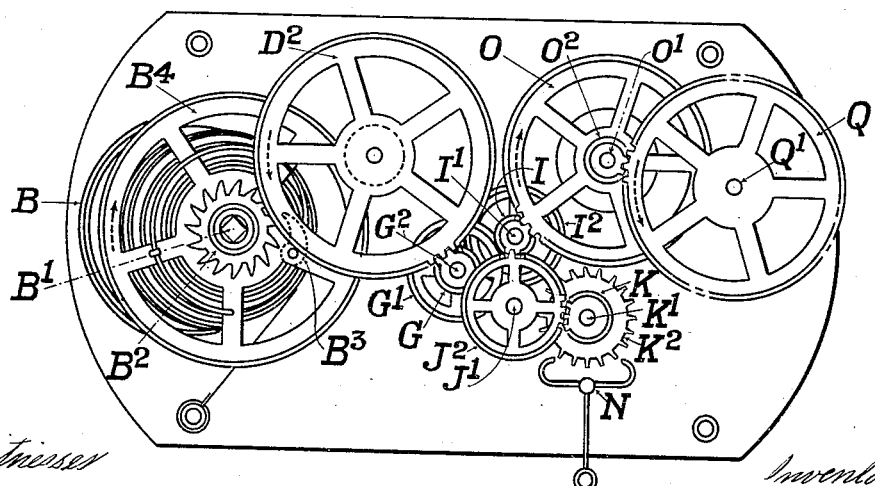

Figure 1, is a general transverse elevation, with lamp shown for dark room demonstration. Fig. 2 is an elevation of center pedestal with model of sun for day light demonstration. Fig. 3 is a general plan view of the apparatus. Fig. 4 is a front end elevation of carriage and gear. Fig. 5 is a detail of cannon wheel and spring bush. Fig. 6 is a top plan view of the carriage. Fig. 7 is a side elevation of carriage and gear. Fig. 8 illustrates the weight employed; and, Fig. 9 is a plan view of the carriage with top plate removed.

Referring to the construction in detail, "$F^1$" is a ring or track provided with teeth on its inner edge, mounted on a bed plate "F" which is connected by spokes "R" to a hub "H." An arc of the track "$F^1$" is shown in Fig. 3. On to the hub "H" is fixed a pedestal "P" carrying a spindle "$P^1$" adapted to rotate in the pedestal.

"A" is a rod connecting together the spindle "$P^1$" and the traveling carriage "C" containing trains of wheels more particularly described hereafter. A lamp "L" for dark room illustrations is mounted on the spindle "$P^1$" and turns therewith through the travel of the carriage. In place of the lamp "L" a ball "S" may be used as for instance in day light demonstrations. Said ball "S" is mounted on a wire or bar "W" which is secured to the spindle "$P^1$."

"$C^1$" is the top plate of the carriage "C" and "$C^2$" the bottom plate between which are contained the trains of wheels.

"$C^3$" is a plate fixed to the carriage and on to which the connecting rod "A" is mounted, and "$C^4$" is a stop lever.

"B" is a clock spring, "$B^1$" the winding spindle thereof, "$B^2$" a ratchet wheel, and "$B^3$" a pawl for engaging said ratchet wheel.

"$B^4$" is a toothed wheel driven by the spring fixed to "$B^1$," engaging with a pinion "D" that is fixed to a spindle "$D^1$." Said spindle "$D^1$" is integral with a toothed wheel "$D^2$" which engages with a pinion "G," and the pinion "G" is integral with a toothed wheel "$G^1$" fixed to a spindle "$G^2$." The wheel "$G^1$" engages with a pinion "I" on the main spindle "$I^1$." The pinion "I" is integral with a toothed wheel "$I^2$" which engages with a pinion "J" that is fixed to a spindle "$J^1$". Secured to the spindle "$J^1$" is a toothed wheel "$J^2$" engaging with a pinion "K" that is fixed to a spindle "$K^1$", and to which is also fixed a governor wheel "$K^2$" that coöperates with a pallet "N". The pinion "I" on the main spindle "$I^1$" also engages with a toothed wheel "O" on a spindle "$O^1$" that is integral with a pinion "$O^2$". Said pinion "$O^2$" engages with a toothed wheel "Q" fixed to a spindle "$Q^1$" which extends through the top plate "$C^1$" and on to which is fixed a pinion "$Q^2$" that engages with a toothed carrier wheel "T". This completes the train from the main spindle "$I^1$" to the carrier wheel "T" which makes one revolution while the carriage "C" makes one circuit of the metal ring "$F^1$". The spindle "$O^1$" extends through the bottom plate "$C^2$" of the carriage and fixed thereto is a pinion "O³" which engages with the teeth of the track and causes the carriage to travel around the ring "F¹". This completes the train to and including the ring "F¹".

On the main spindle "I¹" is a crank "I³" engaging with a slot in a disk "I⁴" fixed to a spindle "I⁵." The spindle "I⁵" is supported by a bracket "T¹" that is mounted on the toothed carrier wheel "T," said spindle "I⁵" is disposed on an incline relatively to said carrier wheel. The spindle "I⁵" is bored in the center to carry a wire "W¹" which supports a ball "E" representing the earth. This completes the train to the globe "E." Fixed also to the spindle "I⁵" is a pinion "I⁶" which engages with a toothed wheel "I⁷" fixed to a spindle "I⁸." Said spindle "I⁸" has fixed thereon a pinion "I⁹" which engages with a toothed wheel "I¹⁰" fixed to a collar "I¹¹" and said collar "I¹¹" runs free upon the spindle "I⁵" which is shouldered below the collar.

"I¹²" is a split spring bush, which fits tightly on collar "I¹¹," to which is pivoted a bifurcated rod "I¹³" provided with a roller "I¹⁴" that travels around upon a ring "T²." Said ring "T²" is attached to the bracket "T¹" which completes the train to the ball "M."

To the end of the rod "I¹³" is suitably fixed a wire "W²" to which is attached a ball "M" representing the moon.

To each end of the carriage "C" on the underside of the plate "C²" is fixed a bracket "C⁵" carrying a spindle 1 and a roller 2. Said rollers 2 are adapted to travel on the track "F¹." (See Figs. 1 and 7). Attached to the top plate "C¹" of the carriage is an arm "C⁴" having a pin "C⁶" for stopping the action of the pallet "N" and arresting the movement of the whole of the mechanism.

Fig. 8 represents a weight for inserting in the ring of the pallet arm "N" for controlling the speed of its movements.

"E¹" is a ring of wire with a circular bow at right angles thereto formed with a cup "E²" at its center for hanging on wire "W¹", illustrating the vertical of the sun upon the earth's surface at all periods of the year, termed the tropical indicator.

In using the invention the carriage is mounted upon the track "F¹" and the motor wound, and the carriage while making one revolution around the track causes the mechanism to operate in the following order:—

The terrestrial globe of the orrery makes $366\frac{128}{450}$ revolutions upon its axis representing $365\frac{6}{25}$ days (which is an error in shortage of true time of $\frac{1}{164359}$ of a day which could be mechanically corrected by a device that it has not been thought necessary to include). As the earth makes one more revolution upon its axis than the number of days recorded by time, so for every day produced by the diurnal motion of the earth, the orb makes $1\frac{450}{164359}$ revolutions. This is in consequence of any given meridian of the earth to be opposite the sun, at any point in the orbit, it must of necessity be brought around to face the radius of the circle of the orbit as the globe moves around the orbit. During one circuit of the terrestrial globe "E" around its orbit, the lunar globe "M" makes $13\frac{3}{4}$ circuits around the globe "E" thus producing $12\frac{3}{7}$ new moons during one travel of the carriage "C" around the plane "F¹", the extra revolution being necessary for the same reason as cited above. The positions called aphelion and perihelion are produced by the perpetual inclination of the globe "E", as it is nearer to the sun when leaning within the circle of the track "F¹" than when leaning away from the circle at the opposite point of the orbit. The globe "E" during the circuit is continually receding from or approaching toward the solar center "S" while in motion around the bed, causing the equinoxes to occur in proper order. The lunar globe "M" during its circuit around the globe "E" approaches nearest thereto at its highest elevation and then recedes therefrom, until at its lowest elevation it is at its greatest distance from the globe "E", thus demonstrating the apogee and perigee of the moon and all the varying distances. By the combined movements of the globe "E" and the globe "M" the lunations of the moon and all its phases are demonstrated in conjunction with the solar center, also the solar and lunar eclipses both partial and total in the order in which they occur in the heavens. The tropical indicator "E¹" throws (in conjunction with the light from the lamp "L") a shadow line on the globe "E" which travels from tropic to tropic during the circuit of the carriage "C" around the track "F¹", and illustrates continuously the apparent track and vertical of the sun during the year.

What I claim is:—

1. In a terrestrial orrery, the combination of a fixed circular track provided with an annular rack; a device representing the sun mounted centrally of said track; a carriage mounted to travel on said track and connected to rotate the sun representing device; a spindle journaled on said carriage; a carrier wheel; a bracket mounted on said carrier wheel; a spindle journaled on said bracket and disposed on an incline relatively to the carrier wheel; connections between said carriage spindle and said inclined spindle; a sphere representing the earth mounted on said inclined spindle; a sphere representing the moon; a bar connecting said sphere representing the moon with said inclined spindle; said moon representing device operable to describe its lunations around the sphere representing the earth; a spring motor mounted on said carriage; gearing connections between said motor and said carriage spindle and gearing connections between the carriage spindle, the carrier wheel, and the rack of the track, substantially as described.

2. In a terrestrial orrery, the combination of a fixed circular track provided with an annular rack; a device representing the sun mounted centrally of said track; a carriage mounted to travel on said track and connected to rotate the sun representing device; a spindle journaled on said carriage; a carrier wheel; a bracket mounted on said carrier wheel; a spindle journaled on said bracket and disposed on an incline relatively to said carrier wheel; connections between said carriage spindle and said inclined spindle; a sphere representing the earth mounted on said inclined spindle; a sphere representing the moon; a bar connecting said sphere representing the moon with said inclined spindle, said moon representing device operable to describe its lunations around the sphere representing the earth; a spring motor mounted on said carriage; a train gearing between said carriage spindle and said spring motor; a second and a third spindle journaled on said carriage; gearing connections between said second and third spindles and said carriage spindle; a pinion on the third spindle meshing with said carrier wheel, and a pinion mounted on said second spindle and meshing with the rack of the track, substantially as described.

3. In a terrestrial orrery, the combination of a fixed circular track provided with an annular rack; a device representing the sun mounted centrally of said track; a carriage mounted to travel on said track and connected to rotate the sun representing device; a spindle journaled on said carriage; a carrier wheel; a bracket mounted on said carrier wheel; a spindle journaled on said bracket and disposed on an incline relatively to said carrier wheel; connections between said carriage spindle and said inclined spindle; a sphere representing the earth mounted on said inclined spindle; a sphere representing the moon; a bar connecting said sphere representing the moon with said inclined spindle, said moon representing device operable to describe its lunations around the sphere representing the earth; a spring motor mounted on said carriage; a pinion connected to be driven from said spring motor; a relatively larger pinion secured to said pinion; a relatively smaller pinion meshing with said larger pinion; a pinion secured to the third named pinion; a pinion mounted on the carriage spindle, and meshing with the fourth named pinion; a second spindle journaled on said carriage; intermeshing pinions mounted on said carriage and second spindles respectively; gearing connections between the carriage spindle and said carrier wheel; and a pinion meshing with the rack of said track, and mounted on said second spindle, substantially as described.

4. In a terrestrial orrery, the combination of a fixed circular track provided with an annular rack; a device representing the sun mounted centrally of said track; a carriage mounted to travel on said track and connected to rotate the sun representing device; a spindle journaled on said carriage; a carrier wheel; a bracket mounted on said carrier wheel; a spindle journaled on said bracket and disposed on an incline relatively to said carrier wheel; a sphere representing the earth mounted on said inclined spindle; a second spindle journaled on said bracket; a sleeve mounted on said inclined spindle; intermeshing pinions connecting the inclined spindle with said sleeve through said second spindle on said bracket; an inclined and annular track mounted on said bracket; an arm mounted to travel on said inclined track, and having a loose connection with the sleeve on said inclined spindle; a sphere representing the moon; a bar connecting said sphere representing the moon with said arm; a spring motor mounted on the carriage; gearing connections between said carriage and the rack of the track; and driving connections between said spring motor, the carriage spindle, the carrier wheel, and said track gearing connection, substantially as described.

5. The combination with a terrestrial orrery having an illuminating device representing the sun; a carriage operable to describe a circular path around said sun representing device; a spindle mounted on an incline relatively to said carriage; a sphere representing the earth mounted on said spindle; means for actuating said spindle for imparting an elliptical path of movement to the sphere representing the earth; of an annular member surrounding the sphere representing the earth, and coöperable with the sun device to produce a shadow on said earth representing sphere; and a device for balancing said annular member on said inclined spindle, whereby the shadow line produced on the sphere representing the earth will indicate the tropical zones thereof, substantially as described.

In testimony whereof I have signed my name to this specification in the presence of two subscribing witnesses.

CHARLES SHELDON.

Witnesses:
ELAN HILL,
OLIVE K. ABELL.

Copies of this patent may be obtained for five cents each, by addressing the "Commissioner of Patents, Washington, D. C."